Patented Feb. 2, 1937

2,069,302

UNITED STATES PATENT OFFICE 2,069,302

MANUFACTURE OF HYDROXY ALIPHATIC AMINES

Henry Dreyfus, London, England

No Drawing. Application May 5, 1931, Serial No. 535,285. In Great Britain June 16, 1930

10 Claims. (Cl. 260—127)

This invention relates to improvements in the manufacture of organic compounds and in particular in the manufacture of hydroxy aliphatic amines.

Hydroxy aliphatic amines, for instance, ethanolamine, propanolamine and like amino alcohols have recently acquired a considerable importance from the technical point of view. For instance they are of considerable value in the dyeing industry, both from the point of view of the actual manufacture of dyestuffs and also in the application of the dyestuffs to textile materials. Further they are of value in all arts in which organic amines, which have a considerable affinity for water, are required. For instance in the manufacture of textile soaps the ethanolamine or like amino alcohols have proved of considerable importance. Again the amino alcohols exhibit considerable swelling action towards cellulose derivatives. The present invention is concerned with new and cheaper methods for the manufacture of such products.

According to the present invention hydroxy aliphatic amines are manufactured by reduction of cyanhydrins.

The cyanhydrins may be manufactured very cheaply and with good yield by the action of hydrocyanic acid upon aliphatic aldehydes or ketones, preferably in presence of caustic alkali or potassium or sodium carbonate or other alkalies or potassium or sodium cyanide or the like, and the present invention particularly contemplates a combined manufacture of the hydroxy aliphatic amines from aldehydes or ketones by treatment with hydrocyanic acid followed by reduction of the product. It will thus be seen that the invention is of especial value in the manufacture of β-hydroxy aliphatic amines. In the case of carrying out the reaction with hydrocyanic acid in presence of alkali as referred to above, the hydrocyanic acid may either be introduced as such and a suitable quantity of alkali admixed therewith, or an alkali cyanide may be used in conjunction with sufficient acid so as to liberate most of the hydrocyanic acid.

As starting materials for treatment according to the present invention the following cyanhydrins may be instanced as examples:—
hydroxy-aceto nitrile or glycollic acid nitrile, lactic acid nitrile, α-hydroxy butyric acid nitrile and tartaric acid dinitrile (obtainable respectively from hydrocyanic acid and formaldehyde, acetaldehyde, propionaldehyde and glyoxal) and other nitriles of α-hydroxy aliphatic acids. It will be appreciated however that the invention is not limited to the treatment of nitriles of α-hydroxy aliphatic acids, since in many cases other cyanhydrins may be produced very cheaply and are therefore a ready source for the manufacture of hydroxyalkylamines. Thus for instance hydracrylic acid nitrile may be formed very readily by the action of ethylene oxide on anhydrous hydrocyanic acid and therefore forms a useful starting material for the manufacture of an hydroxypropylamine.

The reduction according to the present invention may be effected by any suitable method, for instance by treatment with zinc and dilute sulphuric acid, or by treatment with sodium or sodium amalgam in alcohol. Preferably however the reduction according to the present invention is effected by hydrogenation in presence of a catalyst. Thus, for instance, the reduction may be effected by treatment with hydrogen in presence of nickel, copper, platinum, palladium, cobalt or iron or other suitable hydrogenation catalyst. The hydrogenation may be effected under pressure or at atmospheric pressure, and pure hydrogen or gases containing hydrogen with or without carbon monoxide, for example water gas, town gas, producer gas or the like may be employed.

The hydrogenation may be effected in the liquid phase in presence or absence of a suitable diluent. In some cases a hydrogenation in presence of an acid medium, e. g. a medium made acid with hydrochloric acid, presents advantages, notably when palladium is employed as catalyst. As an alternative, where feasible, the vapours of the cyanhydrin may be passed together with hydrogen or hydrogen containing gases over a heated hydrogenation catalyst. Preferably such reduction in the vapour phase is effected under reduced pressure in order to avoid or reduce decomposition of the cyanhydrin.

The hydroxy aliphatic amines produced according to the present invention, for example ethanolamine or β-hydroxypropylamine may be further worked up into useful products, for example by esterifying the hydroxy group or by alkylating, aralkylating or acylating the amino group.

As previously indicated the hydroxy alkyl amines produced according to the present invention may be used for the production of textile soaps and also in dispersion processes either as such or in the form of their soaps. Again they may be used to introduce hydroxyalkylamino substituents into organic compounds and particularly into dyestuffs. The hydroxyalkylamino dyestuffs have recently acquired considerable importance, particularly in connection with the colouration of materials made of or containing cellulose esters or ethers. The hydroxyalkylamines may for example be brought to reaction with an anthraquinone derivative containing a negative substituent, for example a nitro or a halogen group, so as to substitute the hydroxyalkylamino group for the negative substituent, or again leuco hydroxyanthraquinones may be treated under pressure with oxyalkylamines to produce the corresponding leuco hydroxyalkylamino anthraquinones, which may be oxidized to the dyestuffs. Similarly hydroxyalkylamino derivatives of dyestuffs or other series may be produced.

The following example illustrates the invention but is not to be considered as limiting it in any way.

*Example*

100 parts of potassium cyanide dissolved in 200 parts of water are introduced into a suitable vessel fitted with a reflux condenser and a cooling jacket. The whole is cooled down to a temperature of 0 to 10° C., and a mixture of 140 parts of 40% formaldehyde solution added together with 100 parts of water. After a few minutes there are added, while still cooling, 150 parts of 15% hydrochloric acid. Towards the end of the reaction the cooling may be stopped, and if necessary heat applied, but usually the reaction may be completed without heat. There is then added sodium carbonate solution until the reaction mixture is not quite neutral, that is to say it still has a slightly acid reaction to litmus. The liquor containing glycollic acid nitrile is run into an autoclave fitted with a stirrer and arrangements for introducing gas under pressure. There are then added 0.5 to 1.0 part of palladium chloride in aqueous solution together with a suitable protective colloid, such as gum arabic, after which hydrogen or gases containing hydrogen are introduced to a pressure of 10 to 30 atmospheres. The mixture is stirred and the reaction continued until no more hydrogen is absorbed (ascertained by pressure measurement). The reaction liquor is thereafter run into a still suitable for steam distillation, and the ethanolamine produced by the hydrogenation is removed by distillation in steam.

What I claim and desire to secure by Letters Patent is:—

1. Process for the production of hydroxy primary aliphatic amines, which comprises subjecting the nitriles of aliphatic α-hydroxy carboxylic acids to reduction.

2. Process for the production of hydroxy primary aliphatic amines, which comprises subjecting the nitriles of lower aliphatic α-hydroxy carboxylic acids to reduction.

3. Process for the production of hydroxy primary aliphatic amines, which comprises catalytically hydrogenating the nitriles of aliphatic α-hydroxy carboxylic acids.

4. Process for the production of ethanolamine comprising subjecting glycollic acid nitrile to reduction.

5. Process according to claim 4 wherein the reduction is effected by means of catalytic hydrogenation.

6. Process according to claim 3 wherein the hydrogenation is effected in the liquid phase.

7. Process for the production of hydroxy primary aliphatic amines, which comprises catalytically hydrogenating the nitriles of lower aliphatic α-hydroxy carboxylic acids.

8. Process according to claim 7 wherein the hydrogenation is effected in the liquid phase.

9. In a process for the manufacture of hydroxy primary aliphatic amines from aliphatic aldehydes and aliphatic ketones which react with hydrocyanic acid to give nitriles of aliphatic α-hydroxy carboxylic acids, the step of subjecting the nitriles so obtained to reduction.

10. In a process for the manufacture of hydroxy primary aliphatic amines from lower aliphatic aldehydes and lower aliphatic ketones which react with hydrocyanic acid to give nitriles of aliphatic α-hydroxy carboxylic acids, the step of subjecting the nitriles so obtained to reduction.

HENRY DREYFUS.